United States Patent
Shen

(10) Patent No.: US 11,877,266 B2
(45) Date of Patent: Jan. 16, 2024

(54) TIME SLOT INDICATION METHOD, TERMINAL DEVICE, NETWORK DEVICE AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/716,243

(22) Filed: Dec. 16, 2019

(65) Prior Publication Data
US 2020/0120672 A1    Apr. 16, 2020

Related U.S. Application Data

(63) Continuation of application No. PCT/CN2017/111364, filed on Nov. 16, 2017.

(51) Int. Cl.
*H04W 72/0446* (2023.01)
*H04W 76/28* (2018.01)
(Continued)

(52) U.S. Cl.
CPC ....... *H04W 72/0446* (2013.01); *H04L 1/1614* (2013.01); *H04W 72/23* (2023.01); *H04W 76/28* (2018.02)

(58) Field of Classification Search
CPC .......... H04W 72/0446; H04W 72/042; H04W 76/28; H04L 1/1614
See application file for complete search history.

(56) References Cited

U.S. PATENT DOCUMENTS

2010/0177745 A1   7/2010   Baker et al.
2015/0305029 A1  10/2015   Rao et al.
(Continued)

FOREIGN PATENT DOCUMENTS

CN    101272525 A    9/2008
CN    103503344 A    1/2014
(Continued)

OTHER PUBLICATIONS

Islam et al., "Systems and Method for Configuring Slot Formats with Multiple Switching Points per Slot", U.S. Appl. No. 62/559,479, filed Sep. 15, 2017 (Year: 2017).*

(Continued)

*Primary Examiner* — Thinh D Tran
(74) *Attorney, Agent, or Firm* — Young Basile Hanlon & MacFarlane, P.C.

(57) ABSTRACT

Disclosed in the present invention is a time slot indication method, a terminal device, a network device and a computer storage medium, wherein, the method includes the following acts: acquiring N pieces of format indication information from first control information sent from a network side, wherein N is an integer greater than or equal to 1; determining N time slots corresponding to the N pieces of format indication information in the first control information, wherein at least part of the N time slots are discontinuous, and the N time slots are time slots for which DL/UL assignments may be changed; and determining formats of the N time slots based on the N pieces of format indication information.

8 Claims, 5 Drawing Sheets

(51) Int. Cl.
  *H04L 1/1607*   (2023.01)
  *H04W 72/23*   (2023.01)

(56) References Cited

U.S. PATENT DOCUMENTS

| | | | |
|---|---|---|---|
| 2015/0326492 A1* | 11/2015 | Jeong | H04W 74/0866 370/329 |
| 2017/0055234 A1 | 2/2017 | Seo et al. | |
| 2018/0309513 A1* | 10/2018 | Kim | H04L 5/0094 |
| 2019/0082448 A1* | 3/2019 | Nogami | H04L 5/0053 |
| 2019/0089584 A1* | 3/2019 | Islam | H04L 41/0803 |
| 2019/0150124 A1* | 5/2019 | Nogami | H04L 5/0044 370/330 |
| 2020/0221481 A1* | 7/2020 | Park | H04W 4/70 |
| 2020/0229270 A1* | 7/2020 | Chatterjee | H04W 80/08 |
| 2020/0260442 A1* | 8/2020 | Yi | H04W 72/0446 |
| 2020/0287676 A1* | 9/2020 | Jo | H04W 72/042 |

FOREIGN PATENT DOCUMENTS

| | | | |
|---|---|---|---|
| CN | 104054291 | A | 9/2014 |
| CN | 107295679 | A | 10/2017 |
| GB | 2566319 | A | 3/2019 |
| RU | 2015128808 | A | 2/2017 |
| WO | 2010111949 | A1 | 10/2010 |
| WO | 2012092879 | A1 | 7/2012 |
| WO | 2013044771 | A1 | 4/2013 |
| WO | 20170133417 | A1 | 1/2017 |
| WO | 2017157312 | A1 | 9/2017 |

OTHER PUBLICATIONS

3GPP TSG RAN WG1 Meeting NR#90bis; Prague, CZ, Oct. 9-13, 2017; R1-1718044 (Year: 2017).*
Yunjung Yi, "UE Behavior for Group Common DCI/PDCCH", U.S. Appl. No. 62/577,692, filed Oct. 26, 2017 (Year: 2017).*
ITRI, "UE behaviour in unknown resource", 3GPP TSG RAN WG1 Meeting #90bis, R1-1718078, Oct. 9-13, 2017 (Year: 2017).*
CMCC, "Discussion on Signaling and UE behavior for DL and UL transmission assignment", 3GPP TSG RAN WG1 Meeting 90bis, R1-1717885, Oct. 9-13, 2017 (Year: 2017).*
Nokia, Nokia Shanghai Bell, "On the remaining aspects of group-common PDCCH in NR", 3GPP TSG-RAN WG1 RAN1#90bis, R1-1718603, Oct. 9-13, 2017 (Year: 2017).*
3GPP TSG RAN WG1 NR Ad-Hoc#2; R1-1711247; Jun. 27-30, 2017; Qingdao, P.R. China.
3GPP TSG RAN WG1 Meeting 90bis; R1-1718276; Prague, CZ, Oct. 9-13, 2017.
Extended European Search Report for EP Application 17932568.3 dated Jun. 23, 2020.
3GPP TSG RAN WG1 Meeting NR#3; Nagoya, Japan, Sep. 18-21, 2017; R1-1716565.
3GPP TSG RAN WG1 NR Meeting 90bis; Prague, CZ, Oct. 9-13, 2017; R1-1717485.
3GPP TSG RAN WG1 Meeting NR#90bis; Prague, CZ, Oct. 9-13, 2017; R1-1718044.
3GPP TSG RAN WG1 Meeting #91; Reno, USA, Nov. 27-Dec. 1, 2017; R1-1719301.
Communication pursuant to Article 94(3) EPC Examination for EP Application 17932568.3 dated Dec. 8, 2020.
Russia Notice of Allowance with English Translation for RU Application 2019144150/07(085382) dated Dec. 11, 2020.
India First Examination for IN Application 201917052346 dated Feb. 17, 2021.
Canada First Office Action for CA Application 3067476 dated Mar. 22, 2021.
Communication pursuant to Article 94(3) EPC Examination for EP Application 179325683 dated Jun. 11, 2021.
Chile First Office Action with English Translation for CL Application 2020000045 dated Apr. 15, 2021.
Chile Office Action with English Translation for CL Application 2020000045 dated Oct. 7, 2021. (10 pages).
Communication pursuant to Article 94(3) EPC for EP Application 17932568.3 dated Nov. 17, 2021. (8 pages).
Japanese Office Action with English Translation for JP Application 2019570066 dated Nov. 19, 2021. (11 pages).
3GPP TSG RAN WG1 Meeting #91 Reno, USA, Oppo, Remaining issues on GC-PDCCH R1-1719984, Nov. 27-Dec. 1, 2017. (8 pages).
Canadian Examination Report for CA Application 3067476 dated Feb. 2, 2022. (4 pages).
Korean Office Action with English Translation for KR Application 1020197037252 dated Mar. 15, 2022. (10 pages).
Japanese Decision to Grant a Patent with English Translation for JP Application 2019570066 dated Jul. 15, 2022. (6 pages).
Israel Office Action for IL Application 271556 dated Jul. 11, 2022. (4 pages).
Indonesia Office Action with English Translation for ID Application P00202000257 dated Jul. 7, 2022. (5 pages).
Huawei, HiSilicon, Remaining details on group-common PDCCH, 3GPP TSG RAN WG1 Meeting 90bis, R1-1717063, Oct. 9-13, 2017. (6 pages).
Communication pursuant to Article 94(3) EPC for EP Application 17932568.3 dated Jun. 2, 2022. (6 pages).
Sony, On remaining details on group-common PDCCH, 3GPP TSG RAN WG1 Meeting NR#3, R1-1716247, Sep. 18-21, 2017. (4 pages).
ZTE, Sanechips, Remaining details on group-common PDCCH, 3GPP TSG RAN WG1 Meeting #90bis, R1-1717512, Oct. 9-13, 2017. (6 pages).
LG Electronics, Discussion on group common Pdcch, 3GPP TSG RAN WG1 #90bis, R1-1717953, Oct. 9-13, 2017. (11 pages).
InterDigital Inc., On group-common PDCCH structure and contents, 3GPP TSG RAN WG1 Meeting 90bis, R1-1718489, Oct. 9-13, 2017. (4 pages).
Chinese First Office Action with English Translation for CN Application 202010079345.6, dated Oct. 31, 2022. (12 pages).
Korean Written Decision on Registration with English Translation for KR Application 1020197037252 dated Sep. 21, 2022. (3 pages).
3GPP TSG RAN WG1 Meeting Ah #NR3, Nagoya, Japan, R1-1715815, CATT, Outstanding aspects of slot format Indication, Sep. 18-21, 2017. (10 pages).
Chinese Notification to grant Patent Right for Invention with English Translation for CN Application 202010079345.6 dated May 31, 2023. (10 pages).
Chinese First Office Action with English Translation for CN Application 201780091964.3 dated Jul. 28, 2023. (17 pages).

* cited by examiner

TIME SLOT INDICATION METHOD, TERMINAL DEVICE, NETWORK DEVICE AND COMPUTER STORAGE MEDIUM

CROSS-REFERENCE TO RELATED APPLICATION(S)

The present application is a continuation application of PCT patent application No. PCT/CN2017/111364, filed on Nov. 16, 2017, the entire content of which is hereby incorporated by reference.

TECHNICAL FIELD

The present disclosure relates to the technical field of communication processing, in particular to a time slot indication method, a terminal device, a network device and a computer storage medium.

BACKGROUND

An LTE system adopts a static frame structure. Within a period (e.g. 10 ms, 5 ms), which subframes are uplink subframes, downlink subframes and special subframes are fixed. A 5G NR system introduces a Slot Format Indicator (SFI) to indicate a slot format, it may indicate which symbols in a slot are downlink symbols, which symbols are uplink symbols, which symbols are reserved symbols, and which symbols are unknown symbols. An SFI may be semi-statically configured through RRC signaling and dynamically indicated through PDCCH. One PDCCH may indicate SFIs of N continuous time slots (e.g., N=1, 2, 5, 10, 20, etc.) at one time. An SFI of each time slot is of N bits (e.g., N=6), and may indicate $2^N$ (e.g., 64) RRC configured time slot formats. According to an existing technical solution, the use of the downlink symbols, uplink symbols and reserved symbols configured through the semi-static SFI may not be converted through the dynamic SFI, but unknown symbols configured through the semi-static SFI may be converted through the dynamic SFI into downlink symbols or uplink symbols.

However, when using the semi-static SFI and the dynamic SFI in combination, the existing solution will cause a large control signaling overhead and may not realize flexible dynamic SFI indication. The existing solution may also limit the indication flexibility and efficiency of the dynamic SFI.

SUMMARY

To solve the above technical problems, implementations of the present disclosure provide a time slot indication method, a terminal device (UE), a network device and a computer storage medium.

An implementation of the present disclosure provides a time slot indication method, applied to a terminal device, including: acquiring N pieces of format indication information from first control information sent from the network side; wherein N is an integer greater than or equal to 1; determining N time slots corresponding to the N pieces of format indication information in the first control information; wherein at least part of the N time slots are discontinuous; and determining formats of the N time slots based on the N pieces of format indication information.

An implementation of the present disclosure provides a time slot indication method, applied to a network device, including: sending first control information containing N pieces of format indication information to a terminal device; wherein the N pieces of format indication information correspond to N time slots of the terminal device, and at least part of the N time slots are discontinuous.

An implementation of the present disclosure provides a terminal device, including: a first communication unit, configured to acquire N pieces of format indication information from first control information sent from a network side; wherein N is an integer greater than or equal to 1; and a first processing unit, configured to determine N time slots corresponding to the N pieces of format indication information in the first control information; wherein at least part of the N time slots are discontinuous; and determine formats of the N time slots based on the N pieces of format indication information.

An implementation of the present disclosure provides a network device, includes: a second communication unit, configured to send first control information containing N pieces of format indication information to a terminal device; wherein the N pieces of format indication information correspond to N time slots of the terminal device, and at least part of the N time slots are discontinuous.

An implementation of the present disclosure provides a terminal device, including a processor and a memory for storing a computer program capable of running on the processor, and the processor is used for, when the computer program is running, performing acts of the above method.

An implementation of the present disclosure provides a network device, including a processor and a memory for storing a computer program capable of running on the processor, and the processor is used for, when the computer program is running, performing acts of the above method.

An implementation of the present disclosure provides a computer storage medium, the computer storage medium stores computer-executable instructions which, when executed, implement acts of the aforementioned method.

DETAILED DESCRIPTION

To understand features and technical contents of implementations of the present disclosure in more detail, realizations of the implementations of the present disclosure will be described in detail below with reference to the drawings, which are used for reference only and are not intended to limit the implementations of the present disclosure.

Figure 1:
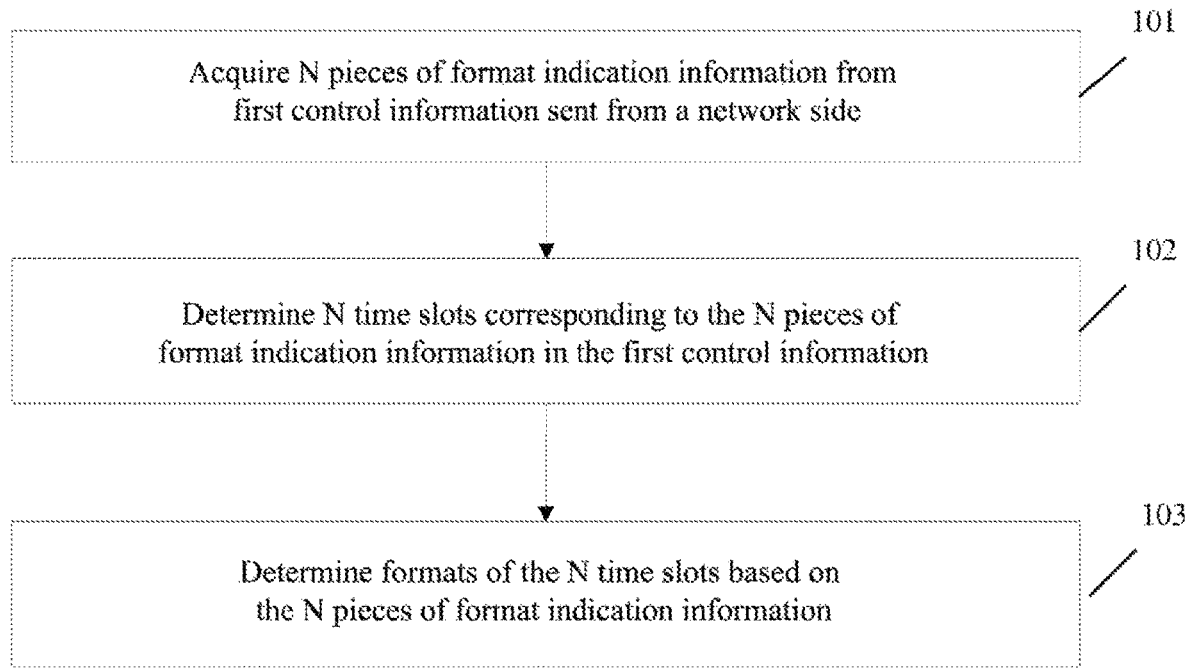
FIG. 1 is a flowchart of a time slot indication method according to an implementation of the present disclosure.

An implementation of the present disclosure provides a time slot indication method, applied to a terminal device, as shown in FIG. 1, including acts 101-103.

In act 101, N pieces of format indication information are acquired from first control information sent from a network side; wherein N is an integer greater than or equal to 1.

In act 102, N time slots corresponding to the N pieces of format indication information in the first control information are determined; wherein at least part of the N time slots are discontinuous.

In act 103, formats of the N time slots are determined based on the N pieces of format indication information.

The terminal acquires the first control information from the network device which contains N (N≥1) pieces of format indication information.

The format indication information includes at least one of the following: a size and/or a position of a downlink portion, a size and/or a position of an uplink portion, a size and/or a position of a reserved portion, and a size and/or a position of an unidentified (such as unknown) portion.

The N time slots are time slots of which at least partial formats may be changed.

Figure 2:
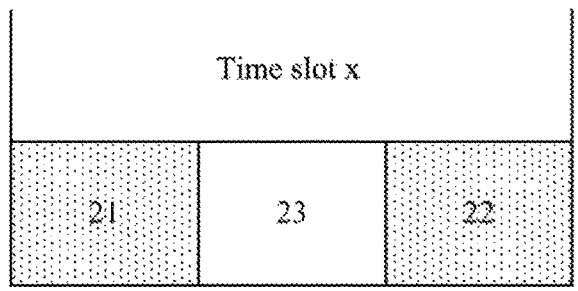
FIG. 2 is a schematic diagram of a time slot format according to an implementation of the present disclosure.

For example, as shown in FIG. 2, one time slot x may include an uplink portion 21, a downlink portion 22, and a reserved portion 23. It should be understood that FIG. 2 is only an example, and the aforementioned unidentified (such as unknown) portion, which is not shown, may exist in the time slot.

It should be pointed out that each piece of format indication information may indicate a format corresponding to one time slot, wherein the terminal determines the N pieces of time slot format information are for which N time slots according to a first mapping relation, and the N time slots may be continuous or discontinuous time slots.

At this point, the formats of N continuous or discontinuous time slots may be determined based on the first control information.

Further, modes for determining N continuous or discontinuous time slots may include the following modes.

In a first mode, specifically, before acquiring the N pieces of format indication information from the first control information sent from the network side, the method further includes: acquiring a first bitmap from second control information or from the first configuration information sent from the network side. Wherein, the first bitmap contains M bits, and each bit is used to indicate whether the format of the time slot corresponding to the bit is determined through the format indication information in the first control information, and M is an integer greater than or equal to N.

The second control information and the first control information in the step 101 may be the same piece of information, that is, before acquiring the N pieces of format indication information from the first or second control information, a first bitmap may be extracted firstly. Of course, the second control information and the first control information in the step 101 may be different information, that is, before receiving the first control information, the second control information may be acquired from the network side first, the first bitmap is obtained by extracting from the second control information in advance, then the act 101 is executed.

In addition, the first configuration information sent from the network side may be information configured through RRC information, that is, the network side sends the configured time slot format to the UE in advance through the first configuration information, which may be considered as semi-static information.

The first bitmap may include M bits. When an indication value for a time slot is 1, it may indicate that this time slot uses the format indication information in the first control information to determine its time slot format. When an indication value for a time slot is 0, it may indicate that the format of this time slot is not applicable to being determined through the format indication information in the first control information. Or vice versa, as long as the terminal and the network side may correctly identify.

Figure 3:
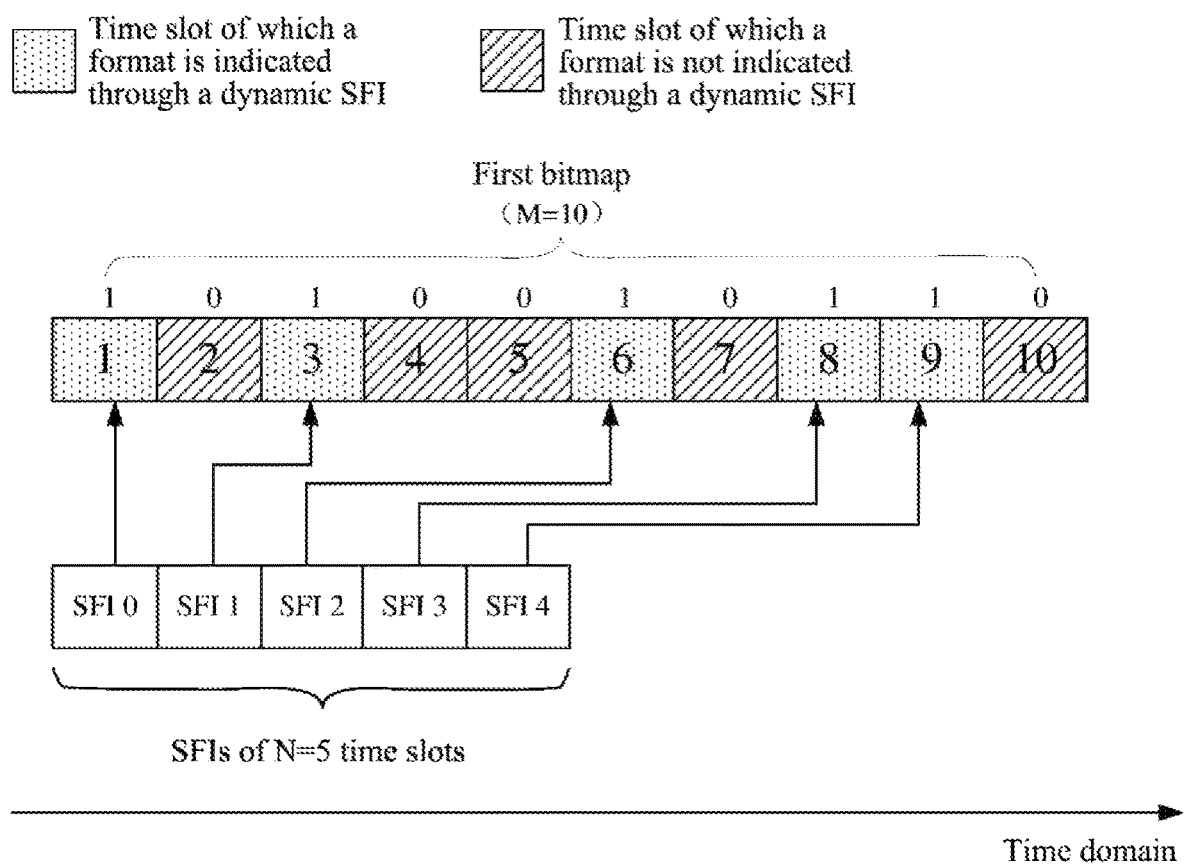
FIG. 3 is a schematic diagram of correspondence between a first bitmap and first control information according to an implementation of the present disclosure.

As shown in FIG. 3, each bit may be used to indicate a time slot corresponding to the format indication information in the control information. For example, the first bitmap contains 10 bits, indicating 10 time slots respectively. If setting as 1 indicates that the format of the time slot is determined by the format indication information in the first control information, then the time slots 1, 3, 6, 8 and 9 in the map may be time slots corresponding to the 5 pieces of format indication information in the first control information.

In addition, a way by which a time slot corresponds to format indication information may be set according to an actual situation. For example, it may be set as a positive sequence correspondence, that is, according to a position in the first bitmap, the sequence from left to right corresponds to the same sequence from left to right in the format indication information. Of course, it may also be a reverse sequence correspondence, which is not exhaustive here.

In a second mode, at least one time slot of a first type is determined based on the second configuration information or a predefined configuration sent from the network side. Wherein the time slot of the first type is a time slot of which a corresponding format may be determined based on control information.

The second configuration information may be RRC configuration information. The predefined configuration may be a time slot format pre-configured by the network side.

It should be understood that, in this implementation, whether a time slot of the first type is indicated in the second configuration information or the predefined configuration is the only thing concerned, and whether a time slot of another type is indicated therein is not concerned.

Correspondingly, determination of N time slots corresponding to N pieces of format indication information in the control information includes that the N pieces of format indication information in the control information correspond to N time slots of the first type. The time slots of the first type are time slots containing unidentified (such as unknown) portions.

Figure 4:
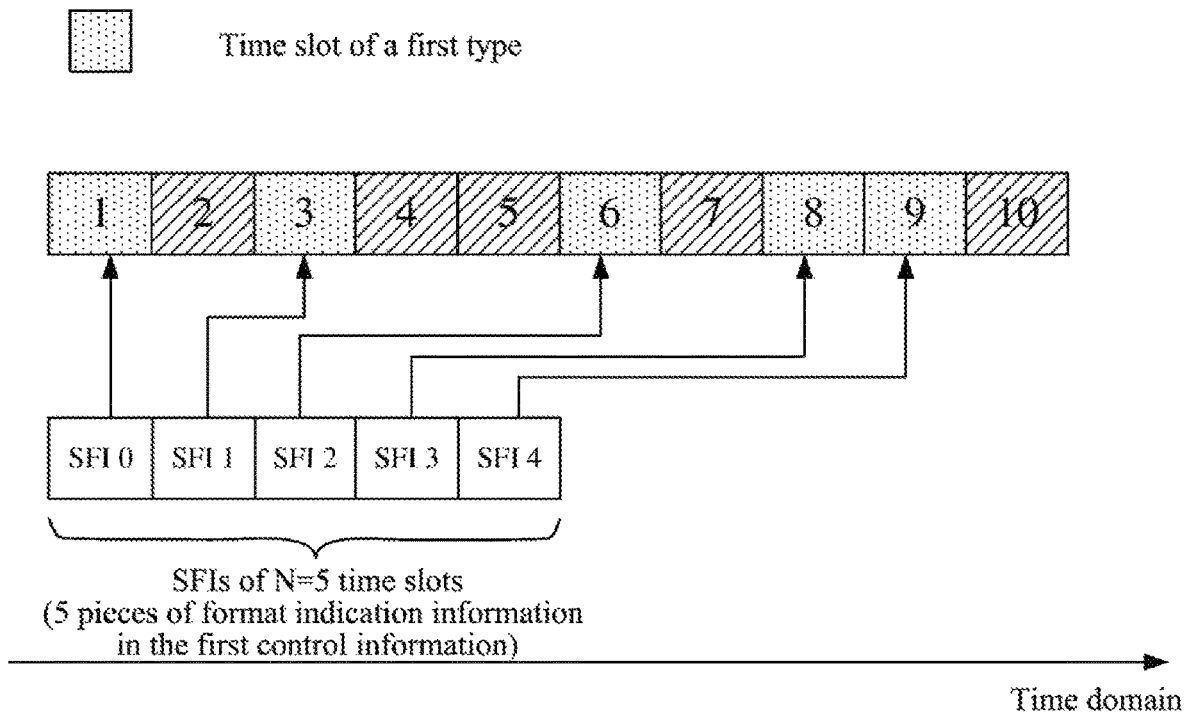
FIG. 4 is a schematic diagram of time slots of a first type according to an implementation of the present disclosure.

In other words, as shown in FIG. 4, only the time slots of the first type are sent to the UE side through the second configuration information or the preset configuration, so that the UE side may implement a corresponding according to the time slots of the first type sent from the network side and the N pieces of format indication information of the first control information, thereby determining the formats of the five time slots of the first types. The time slots of the first type are time slots containing the unidentified (such as unknown) portions.

Specifically, the terminal determines which time slots are the time slots of the first type according to the first configuration information, the time slots of the first type are time slots containing time domain resources of the first type, the time domain resources of the first type are time domain resources of which the usage may be indicated by the control information, and the N pieces of the time slot format information are mapped to the N continuous time slots of the first type.

In this implementation, the first control information and the second control information are downlink control information DCI.

The first configuration information and the second configuration information are radio resource control RRC configuration information or system information.

It can be seen that by adopting the above solution, when receiving the N pieces of format indication information, the N pieces of format indication information may be used to indicate the formats of N time slots, at least part of which are discontinuous, so that the format indication may be carried out only for part of the time slots. Thus, the control signaling overhead may be greatly reduced, and the flexibility of uplink and downlink resource scheduling and resource reservation may be improved.

In addition, since the N time slots may be time slots of which the SFIs are configured only with a semi-static uplink and downlink assignment (semi-static DL/UL assignment) and at least partial formats may be at least partially changed. Therefore, the time slots configured through the semi-static DL/UL assignment, of which the formats may not be changed, may be skipped, and only the time slots of which the formats may be changed are indicated effectively. Thus, control signaling overhead can be further guaranteed to be reduced, and flexibility of uplink and downlink resource scheduling and resource reservation can be improved.

An implementation of the present disclosure provides a time slot indication method, applied to a network device, including: sending first control information containing N pieces of format indication information to the terminal device; wherein the N pieces of format indication information correspond to N time slots of the terminal device; and at least part of the N time slots are discontinuous.

Further, the N time slots are time slots of which at least partial formats may be changed.

The first control information includes N (N≥1) pieces of format indication information.

The format indication information includes at least one of the following: a size and/or a position of a downlink portion, a size and/or a position of an uplink portion, a size and/or a position of a reserved portion, and a size and/or a position of an unidentified (such as unknown) portion.

For example, as shown in FIG. 2, one time slot x may include an uplink portion 21, a downlink portion 22, and a reserved portion 23. It should be understood that FIG. 2 is only an example, and the aforementioned unidentified (such as unknown) portion, which is not shown, may exist in the time slot.

It should be pointed out that each piece of format indication information may indicate a format corresponding to one time slot, wherein the terminal determines N pieces of time slot format information are for which N time slots according to a first mapping relation, and the N time slots may be continuous or discontinuous time slots.

At this point, the formats of N continuous or discontinuous time slots may be determined based on the first control information.

Further, modes for determining N continuous or discontinuous time slots may include the following modes.

In a first way, specifically, before sending the first control information containing the N pieces of format indication information to the terminal device, the method further includes: sending a first bitmap to the terminal device through second control information or through first configuration information. Wherein, the first bitmap contains M bits, and each bit is used to indicate whether a format of a time slot corresponding to the bit is determined through the format indication information in the first control information, and M is an integer greater than or equal to N.

The second control information and the first control information may be the same piece of information, that is, before acquiring the N pieces of format indication information from the first control information, i.e. the second control information, a first bitmap may be extracted firstly. Of course, the second control information and the first control information may be different information, that is, before sending the first control information, the second control information is sent firstly, so that the terminal device may extract the first bitmap from the second control information in advance.

In addition, the first configuration information may be information configured through RRC information, that is, the network side sends the configured time slot format to the UE in advance through the first configuration information, which may be considered as semi-static information.

The first bitmap may include M bits. When an indication value for a time slot is 1, it may indicate that this time slot uses the format indication information in the first control information to determine its time slot format. When an indication value for a time slot is 0, it may indicate that the format of this time slot is not applicable to being determined through the format indication information in the first control information. Or vice versa, as long as the terminal and the network side may correctly identify.

As shown in FIG. 3, each bit may be used to indicate a time slot corresponding to the format indication information in the control information. For example, the first bitmap contains 10 bits, indicating 10 time slots respectively. If setting as 1 indicates that the format of the time slot is determined by the format indication information in the first control information, then the time slots 1, 3, 6, 8 and 9 in the map may be time slots corresponding to the 5 pieces of format indication information in the first control information.

In addition, a way by which a time slot corresponds to format indication information may be set according to an actual situation. For example, it may be set as a positive sequence correspondence, that is, according to a position in the first bitmap, the sequence from left to right corresponds to the same sequence from left to right in the format indication information. Of course, it may also be a reverse sequence correspondence, which is not exhaustive here.

In a second mode, before sending the first control information containing the N pieces of format indication information to the terminal device, the method further includes: sending second configuration information to the terminal device for the terminal device to determine at least one time slot of the first type. The time slot of the first type is a time slot of which a corresponding format may be determined based on the control information.

It should be understood that, in this implementation, whether a time slot of the first type is indicated in the second configuration information or the predefined configuration is the only thing concerned, and whether a time slot of another type is indicated therein is not concerned.

Correspondingly, determination of the N time slots corresponding to N pieces of format indication information in the control information includes that the N pieces of format indication information in the control information corresponds to N time slots of the first type. The time slots of the first type are time slots including unidentified (such as unknown) portions.

In other words, as shown in FIG. 4, only the time slots of the first type may be sent to the UE side through the second configuration information or the preset configuration, so that the UE side may implement a corresponding according to the time slots of the first type sent from the network side and the N pieces of format indication information of the first control information, thereby determining the formats of the five time slots of the first type. The time slots of the first type are time slots containing unidentified (such as unknown) portions.

In this implementation, the first control information and the second control information are downlink control information DCI.

The first configuration information and the second configuration information are radio resource control RRC configuration information or system information.

It can be seen that by adopting the above solution, when receiving the N pieces of format indication information, the N pieces of format indication information may be used to indicate the formats of N time slots, at least part of which are discontinuous, so that the format indication may be carried out only for part of the time slots. Thus, the control signaling overhead may be greatly reduced, and the flexibility of uplink and downlink resource scheduling and resource reservation may be improved.

In addition, since the N time slots may be time slots of which the SFIs are configured only with a semi-static uplink and downlink assignment (semi-static DL/UL assignment) and at least partial formats may be at least partially changed. Therefore, the time slots configured through the semi-static DL/UL assignment, of which the formats may not be changed, may be skipped, and only the time slots of which the formats may be changed are indicated effectively. Thus, control signaling overhead can be further guaranteed to be reduced, and flexibility of uplink and downlink resource scheduling and resource reservation can be improved.

Figure 5:
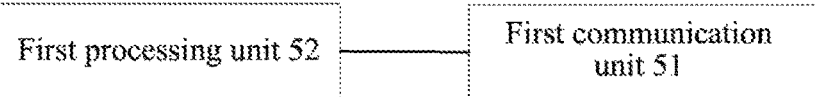
FIG. 5 is a schematic diagram of a structure of a terminal device according to an implementation of the present disclosure.

An implementation of the present disclosure provides a terminal device, as shown in FIG. 5. The terminal device includes a first communication unit 31 and a first processing unit 32.

The first communication unit 51 is configured to acquire N pieces of format indication information from first control information sent from a network side; wherein N is an integer greater than or equal to 1.

The first processing unit 52 is configured to determine N time slots corresponding to the N pieces of format indication information in the first control information; wherein at least part of the N time slots are discontinuous; and determine formats of the N time slots based on the N pieces of format indication information.

The terminal acquires the first control information from the network device, which contains N (N≥1) pieces of format indication information. Wherein the N time slots are time slots of which at least partial formats may be changed.

The format indication information includes at least one of the following: a size and/or position of a downlink portion, a size and/or position of an uplink portion, a size and/or position of a reserved portion, and a size and/or position of an unidentified (such as unknown) portion.

For example, as shown in FIG. 2, one time slot x may include an uplink portion 21, a downlink portion 22, and a reserved portion 23. It should be understood that FIG. 2 is only an example, and the aforementioned unidentified (such as unknown) portion, which is not shown, may exist in the time slot.

It should be pointed out that each piece of format indication information may indicate a format of one time slot, wherein the terminal determines the N pieces of time slot format information are for which N time slots according to a first mapping relation, and the N time slots may be continuous or discontinuous time slots.

At this point, the formats of N continuous or discontinuous time slots may be determined based on the first control information.

Further, modes for determining N continuous or discontinuous time slots may include the following modes.

In a first mode, specifically, the first processing unit 52 acquires a first bitmap from second control information or the first configuration information sent from the network side. Wherein, the first bitmap contains M bits, and each bit is used to indicate whether the format of the time slot corresponding to the bit is determined through the format indication information in the first control information, and M is an integer greater than or equal to N.

The second control information and the first control information may be the same piece of information, that is, before acquiring the N pieces of format indication information from the first or second control information, a first bitmap may be extracted firstly. Of course, the second control information and the first control information may be different information, that is, before receiving the first control information, the second control information may be acquired from the network side first, and the first bitmap is obtained by extracting from the second control information in advance.

In addition, the first configuration information sent from the network side may be information configured through RRC information, that is, the network side sends the configured time slot format to the UE in advance through the first configuration information, which may be considered as semi-static information.

The first bitmap may include M bits. When an indication value for a time slot is 1, it may indicate that this time slot uses the format indication information in the first control information to determine the time slot format. When an indication value for a time slot is 0, it may indicate that the format of this time slot is not applicable to being determined through the format indication information in the first control information. Or vice versa, as long as the terminal and the network side may correctly identify.

As shown in FIG. 3, each bit may be used to indicate a time slot corresponding to the format indication information in the control information. For example, the first bitmap contains 10 bits, indicating 10 time slots respectively. If setting as 1 indicates that the format of the time slot is determined by the format indication information in the first control information, then the time slots 1, 3, 6, 8 and 9 in the map may be time slots corresponding to the 5 pieces of format indication information in the first control information.

In addition, a way by which a time slot corresponds to format indication information may be set according to an actual situation. For example, it may be set as a positive sequence correspondence, that is, according to a position in the first bitmap, the sequence from left to right corresponds to the same sequence from left to right in the format indication information. Of course, it may also be a reverse sequence correspondence, which is not exhaustive here.

In a second mode, the first processing unit 52 is configured to determine at least one time slot of the first type based on the second configuration information or a predefined configuration sent from the network side. Wherein the time slot of the first type is a time slot of which a corresponding format may be determined based on the control information.

The second configuration information may be RRC configuration information. The predefined configuration may be a time slot format pre-configured by the network side.

It should be understood that, in this implementation, whether a time slot of the first type is indicated in the second configuration information or the predefined configuration is the only thing concerned, and whether a time slot of another type is indicated therein is not concerned.

Correspondingly, N pieces of format indication information in the control information correspond to N time slots of the first type. The time slots of the first type are time slots containing unidentified (such as unknown) portions.

In other words, as shown in FIG. 4, only the time slots of the first type may be sent to the UE side through the second configuration information or the preset configuration, so that the UE side may implement a corresponding according to to the time slots of the first type sent from the network side and the N pieces of format indication information of the first control information, thereby determining the formats of the five time slots of the first types. The time slots of the first type are time slots containing the unidentified (such as unknown) portions.

Specifically, the terminal determines which time slots are the time slots of the first type according to the first configuration information, the time slots of the first type are time slots containing time domain resources of the first type, the time domain resources of the first type are time domain resources of which the usage may be indicated by the control information, and the N pieces of the time slot format information are mapped to the N continuous time slots of the first type.

In this implementation, the first control information and the second control information are downlink control information DCI.

The first configuration information and the second configuration information are radio resource control RRC configuration information or system information.

It may be seen that by adopting the above scheme, when receiving the N pieces of format indication information, the N pieces of format indication information may be used to indicate the formats of N time slots, at least part of which are discontinuous, so that the format indication may be carried out only for part of the time slots. Thus, the control signaling overhead may be greatly reduced, and the flexibility of uplink and downlink resource scheduling and resource reservation may be improved.

In addition, since the N time slots may be time slots of which the SFIs are configured only with a semi-static uplink and downlink assignment (semi-static DL/UL assignment) and at least partial formats may be at least partially changed. Therefore, the time slots configured through the semi-static DL/UL assignment, of which the formats may not be changed, may be skipped, and only the time slots of which the formats may be changed are indicated effectively. Thus, control signaling overhead may be further guaranteed to be reduced, and flexibility of uplink and downlink resource scheduling and resource reservation may be improved.

Figure 6:
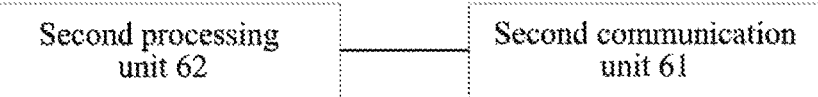
FIG. 6 is a schematic diagram of a structure of a network device according to an implementation of the present disclosure.

An implementation of the present disclosure provides a network device. As shown in FIG. 6, the network device includes a second communication unit 61.

The second communication unit 61 is configured to send first control information containing N pieces of format indication information to the terminal device; wherein the N pieces of format indication information corresponds to N time slots of the terminal device; and at least part of the N time slots are discontinuous.

The first control information includes N (N≥1) pieces of format indication information.

The N time slots are time slots of which at least partial formats may be changed.

The format indication information includes at least one of the following: a size and/or a position of a downlink portion, a size and/or a position of an uplink portion, a size and/or a position of a reserved portion, and a size and/or a position of an unidentified portion.

For example, as shown in FIG. 2, one time slot X may include an uplink portion 21, a downlink portion 22, and a reserved portion 23. It should be understood that FIG. 2 is only an example, and the aforementioned unidentified (such as unknown) portion, which is not shown, may exist in the time slot.

It should be pointed out that each piece of format indication information may indicate a format corresponding to one time slot, wherein the terminal determines N pieces of time slot format information are for which N time slots according to a first mapping relation, and the N time slots may be continuous or discontinuous time slots.

At this point, the formats of N continuous or discontinuous time slots may be determined based on the first control information.

Further, modes for determining N continuous or discontinuous time slots may include the following modes.

In a first mode, specifically, the network device further includes a second processing unit 62.

The second processing unit 62 is configured to determine a first bitmap.

The second communication unit 61 sends the first bitmap to the terminal device through second control information or through the first configuration information.

The first bitmap contains M bits, and each bit is used to indicate whether a format of a time slot corresponding to the bit is determined through the format indication information in the first control information, and M is an integer greater than or equal to N.

The second control information and the first control information may be the same piece of information, that is, before acquiring the N pieces of format indication information from the first control information, i.e. the second control information, a first bitmap may be extracted firstly. Of course, the second control information and the first control information may be different information, that is, before sending the first control information, the second control information is sent first, so that the terminal device may extract the first bitmap from the second control information in advance.

In addition, the first configuration information may be information configured through RRC information, that is, the network side sends the configured time slot format to the UE in advance through the first configuration information, which may be considered as semi-static information.

The first bitmap may include M bits. When an indication value for a time slot is 1, it may indicate that this time slot uses the format indication information in the first control information to determine its time slot format. When an indication value for a time slot is 0, it may indicate that the format of this time slot is not applicable to being determined through the format indication information in the first control information. Or vice versa, as long as the terminal and the network side may correctly identify.

As shown in FIG. 3, each bit may be used to indicate a time slot corresponding to the format indication information in the control information. For example, the first bitmap contains 10 bits, indicating 10 time slots respectively. If setting as 1 indicates that the format of the time slot is determined by the format indication information in the first control information, then the time slots 1, 3, 6, 8 and 9 in the map may be time slots corresponding to the 5 pieces of format indication information in the first control information.

In addition, a way by which a time slot corresponds to format indication information may be set according to an actual situation. For example, it may be set as positive sequence correspondence, that is, according to a position in the first bitmap, the sequence from left to right corresponds to the same sequence from left to right in the format indication information. Of course, it may also be a reverse sequence correspondence, which is not exhaustive here.

In a second mode, the second communication unit 61 is configured to send second configuration information to the terminal device for the terminal device to determine at least one time slot of the first type; the time slot of the first type is a time slot of which a corresponding format may be determined based on the control information.

It should be understood that, in this implementation, whether a time slot of the first type is indicated in the second configuration information or the predefined configuration is the only thing concerned, and whether a time slot of another type is indicated therein is not concerned.

Correspondingly, determination of N time slots corresponding to N pieces of format indication information in the control information includes that the N pieces of format indication information in the control information correspond to N time slots of the first type. The time slots of the first type are time slots containing unidentified (such as unknown) portions.

In other words, as shown in FIG. 4, only the time slots of the first type may be sent to the UE side through the second configuration information or the preset configuration, so that the UE side may perform a corresponding according to the time slots of the first type sent from the network side and the N pieces of format indication information of the first control information, thereby determining the formats of the five time slots of the first type. The time slots of the first type are time slots containing unidentified (such as unknown) portions.

In this implementation, the first control information and the second control information are downlink control information DCI.

The first configuration information and the second configuration information are radio resource control RRC configuration information or system information.

Figure 7:
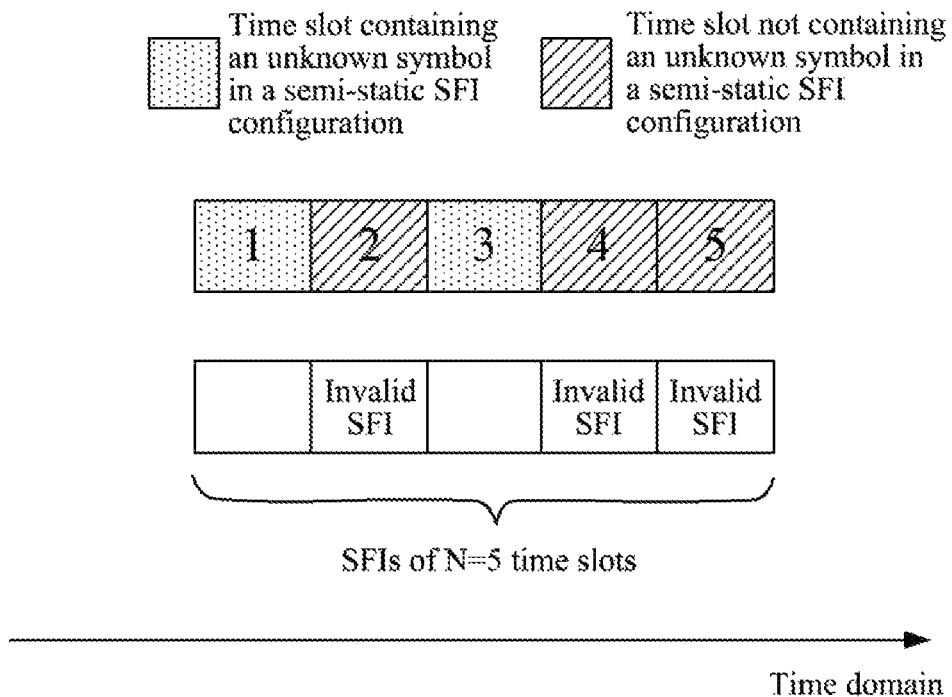
FIG. 7 is a schematic diagram of an indication mode.

At present, in the prior art, when combining a semi-static SFI and a dynamic SFI, a great control signaling overhead will be caused, and a flexible dynamic SFI indication can not be realized, because dynamic SFIs can only indicate SFIs of continuous K time slots, and some of these K time slots may have been configured through the semi-static SFIs and do not contain unknown symbols, so the dynamic SFI signaling for these time slots is invalid and meaningless signaling overhead. As shown in FIG. 7, assuming that the base station sends dynamic SFIs of K=5 time slots to the terminal through PDCCH, but 3 time slots do not contain unknown symbols in the semi-static SFI configuration, the SFIs of these 3 time slots will become invalid SFIs, thus wasting PDCCH signaling overhead.

Figure 8:
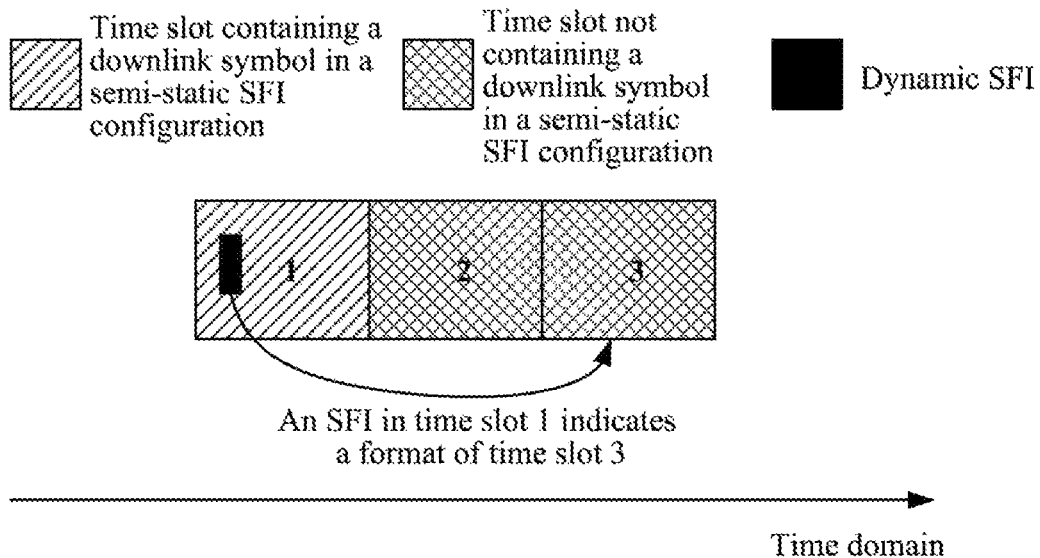
FIG. 8 is a schematic diagram of another indication mode.

In addition, the solution in the prior art may also limit the indication flexibility and efficiency of a dynamic SFI. As shown in FIG. 8, time slot 3 contains unknown symbols, so the base station may indicate the time slot format of this slot, i.e. a dynamic SFI of K=1 time slot needs to be transmitted through PDCCH. However, if time slot 3 itself contains a downlink symbol, then PDCCH may not be carried (PDCCH must be transmitted on a downlink symbol). In this way, the dynamic SFI may only be carried by PDCCH in a time slot containing a downlink symbol before time slot 3. Assuming that a time slot containing a downlink symbol closest to time slot 3 is time slot 1 in FIG. 8, the dynamic SFI may be carried. However, according to the solution in the prior art, K=1 represents that the SFI indicates the time slot format of the current time slot, so the SFI indication in this scenario can not be supported.

Compared with the prior art, it can be seen that by adopting the technical solution provided by the implementation, N pieces of format indication information may be used for indicating the formats of N time slots, at least part of which are discontinuous, when the N pieces of format indication information are received, so that the format indication may be carried out only for part of the time slots. Thus, the control signaling overhead may be greatly reduced, and the flexibility of uplink and downlink resource scheduling and resource reservation may be improved.

In addition, since the N time slots may be time slots of which the SFIs are configured only with a semi-static uplink and downlink assignment (semi-static DL/UL assignment) and at least partial formats may be at least partially changed. Therefore, the time slots configured with the semi-static DL/UL assignment, of which the formats may not be changed, may be skipped, and only the time slots of which the formats may be changed are indicated effectively. Thus, control signaling overhead can be further guaranteed to be reduced, and flexibility of uplink and downlink resource scheduling and resource reservation can be improved.

Figure 9:
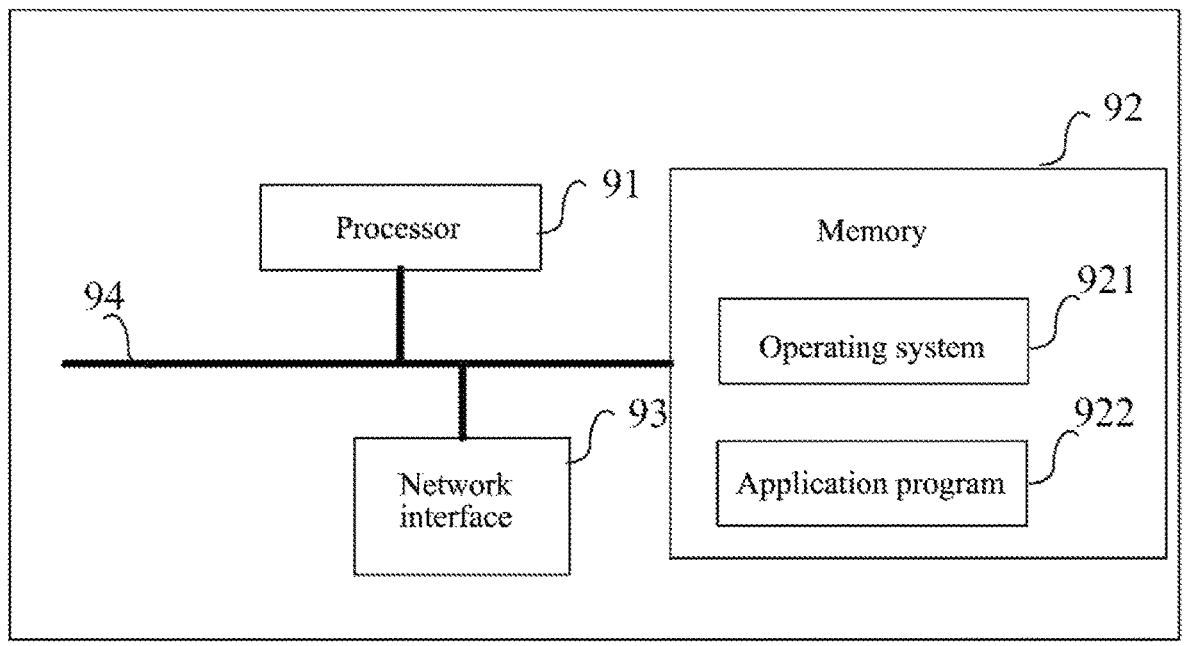
FIG. 9 is a schematic diagram of hardware architecture according to an implementation of the present disclosure.

An implementation of the present disclosure also provides a hardware architecture of a terminal device or a network device, which includes at least one processor 91, a memory 92, and at least one network interface 93, as shown in FIG. 9. The various components are coupled together by a bus system 94. It may be understood that the bus system 94 is used for implementing connection and communication between these components. In addition to a data bus, the bus system 94 further includes a power bus, a control bus, and a status signal bus. However, for clarity, all kinds of buses are uniformly referred to as a bus system 94 in the FIG. 9.

It should be understood that the storage 92 in the implementation of the present disclosure may be a volatile memory or a non-volatile memory, or it may include both volatile and non-volatile memory.

In some implementation modes, the storage 92 stores following elements, executable modules or data structures, or subsets thereof, or extension sets thereof: an operating system 921 and an application program 922.

The processor 91 is configured to process acts in methods in the first implementation or the second implementation, which will not be repeated here.

An implementation of the present disclosure provides a computer storage medium. The computer storage medium stores computer-executable instructions, which, when being executed, implementing acts of the method according to the first implementation or the second implementation.

The above device in the implementations of the present disclosure may also be stored in a computer readable storage medium when implemented in a form of a software function module and sold or used as an independent product. Based on this understanding, the technical solutions in the implementations of the present disclosure, in essence, or a part contributing to the prior art, may be embodied in the form of a software product stored in a storage medium. The computer software product is stored in a storage and includes several instructions for causing a computer device (which may be a personal computer, a server, or a network device, etc.) to perform all or part of the methods described in various implementations of the present disclosure. The aforementioned storage medium includes various media capable of storing program codes such as a U disk, a mobile hard disk, a read-only memory (ROM), a magnetic disk or an optical disk. Thus, the implementations of the present disclosure are not limited to any specific combination of hardware and software.

Correspondingly, an implementation of the present disclosure also provides a computer storage medium in which a computer program is stored, and the computer program is configured to execute the time slot indication method in the implementations of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method of time slot indication, applied to a terminal device, comprising:
    acquiring N pieces of format indication information from first control information sent from a network side; wherein N is an integer greater than 1;
    determining N time slots corresponding to the N pieces of format indication information in the first control information; and
    determining formats of the N time slots based on the N pieces of format indication information;
    wherein each of the N time slots corresponding to the N pieces of format indication information is a time slot of which at least a partial format is flexible;
    wherein at least part of the N time slots are continuous or discontinuous;
    wherein the N time slots comprises at least one time slot of a first type containing an unidentified portion and at least one time slot not containing an unknown symbol;
    wherein before acquiring the N pieces of format indication information from the first control information sent from the network side, the method further comprises:
        receiving second configuration information sent from the network side, wherein the second configuration information only indicates the time slot of the first type in the N time slots, does not indicate the time slot not containing an unknown symbol in the N time slots;
        receiving only an indication of the time slot of the first type and not receiving an indication of the time slot not containing an unknown symbol based on the second configuration information in a case that the N time slots comprise both the time slot of the first type and the time slot not containing an unknown symbol;
        determining at least one time slot of the first type based on the second configuration information sent from the network side, wherein the time slot of the first type is a time slot of which at least partial format is capable of being determined based on control information;
    wherein determining the N time slots corresponding to the N pieces of format indication information in the first control information comprises:
        implementing a correspondence according to the time slot of the first type and the N pieces of format indication information of the first control information;
    wherein determining the formats of the N time slots based on the N pieces of format indication information comprises:
        determining a format only for the time slot of the first type according to the correspondence and not determining a format for the time slot not containing an unknown symbol in the case that the N time slots comprise both the time slot of the first type and the time slot not containing an unknown symbol.

2. The method of claim 1, wherein, the format indication information comprises at least one of:
    at least one of a size or a position of a downlink portion,
    at least one of a size or a position of an uplink portion,
    at least one of a size or a position of a reserved portion,
    or at least one of a size or a position of an unidentified portion.

3. A method of time slot indication, applied to a network device, comprising:
    sending first control information containing N pieces of format indication information to a terminal device, wherein N is an integer greater than 1;
    wherein the N pieces of format indication information correspond to N time slots of the terminal device;
    wherein each of the N time slots corresponding to the N pieces of format indication information is a time slot of which at least a partial format is flexible;
    wherein at least part of the N time slots are continuous or discontinuous;
    wherein the N time slots comprise at least one time slot of a first type containing an unidentified portion and at least one time slot not containing an unknown symbol;
    wherein before sending the first control information comprising the N pieces of format indication information to the terminal device, the method further comprises:
        sending second configuration information providing only an indication of the time slot of the first type and not providing an indication of the time slot not containing an unknown symbol to the terminal device in a case that the N time slots comprise both the time slot of the first type and the time slot not containing an unknown symbol, wherein the second configuration information only indicates the time slot of the first type in the N time slots, does not indicate the time slot not containing an unknown symbol in the N time slots, and is used for the terminal device to determine at least one time slot of the first type;
        implement a correspondence according to the time slot of the first type and the N pieces of format indication information of the first control information; and
        determine a format only for the time slot of the first type according to the correspondence and not determine a format for the time slot not containing an unknown symbol in the case that the N time slots comprise both the time slot of the first type and the time slot not containing an unknown symbol, wherein the time slot of the first type is a time slot of which at least partial format is capable of being determined based on control information.

4. The method of claim 3, wherein the format indication information comprises at least one of:
    at least one of a size or a position of a downlink portion,
    at least one of a size or a position of an uplink portion, at least one of a size or a position of a reserved portion, or at least one of a size or a position of an unidentified portion.

5. A terminal device, comprising: a transceiver, a processor, and a memory for storing a computer program capable of running on the processor; wherein the processor is configured to, when the computer program is running, perform:

acquiring N pieces of format indication information from first control information sent from a network side; wherein N is an integer greater than 1;

determining N time slots corresponding to the N pieces of format indication information in the first control information;

determining formats of the N time slots based on the N pieces of format indication information; wherein each of the N time slots corresponding to the N pieces of format indication information is a time slot of which at least a partial format is flexible; wherein at least part of the N time slots are continuous or discontinuous, wherein the N time slots comprise at least one time slot of a first type containing an unidentified portion and at least one time slot not containing an unknown symbol;

controlling the transceiver to receive second configuration information sent from the network side, wherein the second configuration information only indicates the time slot of the first type in the N time slots and does not indicate the time slot not containing an unknown symbol in the N time slots;

controlling the transceiver to receive only an indication of the time slot of the first type and not receive an indication of the time slot not containing an unknown symbol based on the second configuration information in a case that the N time slots comprise both the time slot of the first type and the time slot not containing an unknown symbol; and determining at least one time slot of the first type based on the second configuration information sent from the network side, wherein the time slot of the first type is a time slot of which a corresponding format is capable of being determined based on control information, wherein determining the N time slots corresponding to the N pieces of format indication information in the first control information comprises implementing a correspondence according to the time slot of the first type and the N pieces of format indication information of the first control information, and wherein determining formats of the N time slots based on the N pieces of format indication information comprises determining a format only for the time slot of the first type according to the correspondence and not determining a format for the time slot not containing an unknown symbol in the case that the N time slots comprise both the time slot of the first type and the time slot not containing an unknown symbol.

6. The terminal device of claim 5, wherein the format indication information comprises at least one of:
at least one of a size or a position of a downlink portion,
at least one of a size or a position of an uplink portion,
at least one of a size or a position of a reserved portion,
or at least one of a size or a position of an unidentified portion.

7. A network device comprising: a processor and a memory for storing a computer program capable of running on the processor, wherein the processor is configured to, when the computer program is running, perform:

sending first control information containing N pieces of format indication information to a terminal device, wherein N is an integer greater than 1, wherein the N pieces of format indication information correspond to N time slots of the terminal device, wherein each of the N time slots corresponding to the N pieces of format indication information is a time slot of which at least a partial format is flexible, wherein at least part of the N time slots are continuous or discontinuous, and wherein the N time slots comprise at least one time slot of a first type containing an unidentified portion and at least one time slot not containing an unknown symbol;

sending second configuration information providing only an indication of the time slot of the first type and not providing an indication of the time slot not containing an unknown symbol to the terminal device in a case that the N time slots comprise both the time slot of the first type and the slot not containing an unknown symbol, wherein the second configuration information only indicates the time slot of the first type in the N time slots, does not indicate the time slot not containing an unknown symbol in the N time slots, and is used for the terminal device to determine at least one time slot of the first type;

implementing a correspondence according to the time slot of the first type and the N pieces of format indication information of the first control information; and determining a format only for the time slot of the first type according to the correspondence and not determining a format for the time slot not containing an unknown symbol in the case that the N time slots comprise both the time slot of the first type and the time slot not containing an unknown symbol, wherein the time slot of the first type is a time slot of which a corresponding format is capable of being determined based on control information.

8. The network device of claim 7, wherein the format indication information comprises at least one of:
at least one of a size or a position of a downlink portion,
at least one of a size or a position of an uplink portion,
at least one of a size or a position of a reserved portion,
or at least one of a size or a position of an unidentified portion.

* * * * *